Figure 1:
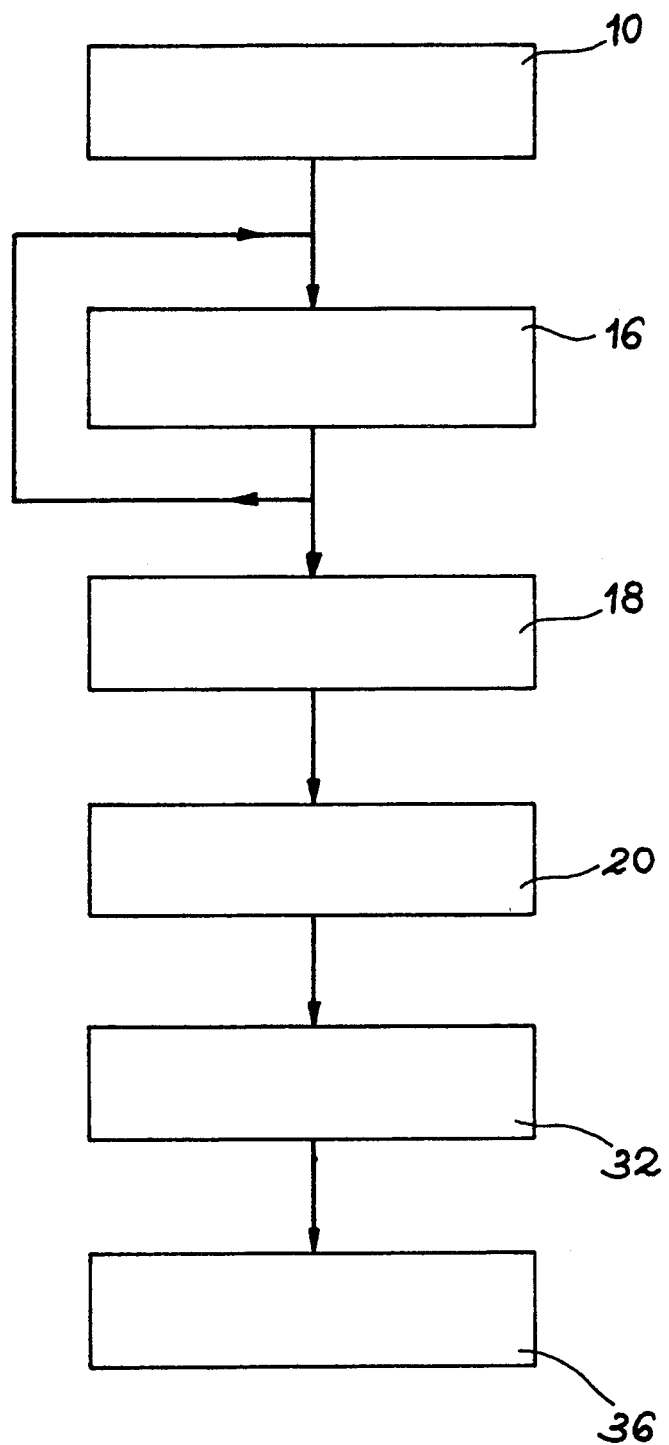

United States Patent [19]

Lequertier

[11] Patent Number: 5,360,638
[45] Date of Patent: Nov. 1, 1994

[54] PROCESS FOR THE PRODUCTION OF A CARBON-CONTAINING COMPOSITE MATERIAL PART PROTECTED AGAINST OXIDATION

[75] Inventor: Jean-Michel Lequertier, St Aubin de Médoc, France

[73] Assignee: Societe Nationale Industrielle et Aerospatiale, France

[21] Appl. No.: 89,409

[22] Filed: Jul. 8, 1993

Related U.S. Application Data

[63] Continuation of Ser. No. 776,582, Oct. 11, 1991, abandoned.

[30] Foreign Application Priority Data

Oct. 24, 1990 [FR] France ............................ 90 13175

[51] Int. Cl.$^5$ ............................................. B05D 5/00
[52] U.S. Cl. .................................. 427/257; 427/249; 427/255.4; 427/261; 427/384; 428/113; 428/114; 428/408
[58] Field of Search ..................... 428/113, 114, 408; 427/249, 255.4, 257, 261, 384

[56] References Cited

U.S. PATENT DOCUMENTS

| | | | |
|---|---|---|---|
| 4,500,602 | 2/1985 | Patten et al. | 428/408 |
| 4,671,997 | 6/1987 | Galasso et al. | 428/408 |
| 4,751,258 | 6/1988 | Minami | 523/414 |
| 4,863,773 | 9/1989 | Rousseau et al. | 428/68 |

FOREIGN PATENT DOCUMENTS

| | | | |
|---|---|---|---|
| 0282386 | 9/1988 | European Pat. Off. | C04B 35/52 |
| 0359614 | 3/1990 | European Pat. Off. | C04B 41/89 |

Primary Examiner—George F. Lesmes
Assistant Examiner—Christopher W. Raimund
Attorney, Agent, or Firm—Hayes, Soloway, Hennessey, Grossman & Hage

[57] ABSTRACT

A process for the production of a carbon-containing composite material part protected against oxidation. The process consists of forming a fibrous preform or blank of the part by superimposing layers of carbon-containing fibres (12), the fibres of each layer being parallel to one another and the fibres of the N outermost layers being oriented in the same plane in accordance with a first or a second direction, with N≧2, said directions being perpendicular to one another. The preform is densified by a carbon-containing densification material. The N-1 outermost densified layers of the densified preform are chemically reacted, at a temperature above ambient temperature, with at least one chemical compound in order to form an outer coating of refractory carbonitride or carbide. The assembly is then cooled in order to form in the outer coating cracks (28) in the direction (z) of its thickness (e) issuing towards the outside, said cracks being oriented in said directions (x,y) and defining between them parallelepipedic carbide or carbonitride blocks (30), and the resulting cracks are then filled.

36 Claims, 5 Drawing Sheets

PROCESS FOR THE PRODUCTION OF A CARBON-CONTAINING COMPOSITE MATERIAL PART PROTECTED AGAINST OXIDATION

This is a continuation of copending application Ser. No. 07/776,582 filed on Oct. 11, 1991, now abandoned.

DESCRIPTION

The present invention relates to a carbon-containing composite material part, which is made unoxidizable up to a temperature of 2000° C. for long periods (several hundred hours), as well as to its production process.

Carbon-containing composite material parts can be used in numerous industrial fields and in particular in the space field, as a result of their low weight, for the production of reusable space vehicles (shuttles or aircraft). These parts must be able to resist the heating caused by the friction of the air during the high speed reentry of the space craft into the atmosphere.

These space craft are in particular those whose reentry missions lead to exposure to high temperatures (1800° C. under an air pressure of 0.1 to 10 kPa) or lead to the exposure of certain parts to variable temperatures (1000° to 1800° C.) at certain points which are more highly stressed than others such as the nose, ailerons and leading edges.

However, the invention also applies in other industrial fields requiring the use of refractory material parts maintaining good mechanical properties above 1100° C. in a corrosive medium. This is in particular the case with turbomotors having an improved efficiency operating at high temperatures (1300° to 1400° C.) and certain industrial heat recuperators.

Carbon-containing materials which are protected against oxidation and to which the present invention applies are composite materials constituted by carbon-containing fibres embedded in a carbon-containing matrix and in particular materials of the carbon-carbon type.

The main problem of composite materials of the carbon-carbon type is their oxidation in air at high temperature leading to the transformation of the carbon into carbon oxide and therefore to a deterioration over time of the composite materials.

In order to avoid this oxidation, various processes have already been envisaged concerning the protection of these materials and based on the use of a silicon carbide coating formed on the outer surface of the composite material parts. This outer SiC coating can be produced by chemical phase vapour deposition (CPVD) by cracking chlorosilane alone or associated with hydrogen and/or hydrocarbons or can be obtained by siliciding the surface carbon of the composite material. These two deposition methods are in particular described in FR-A-2 611 198 filed by the present Applicant.

Surface siliciding is carried out by "PACK-cementation" by immersing the part to be silicided in a mixture of powders which, by heating, gives off vapours of siliciding species such as silicon or silicon monoxide.

Other methods combine the siliciding of the surface carbon of the part with a chemical phase vapour deposition (cf. US-A-3 406 044, US-A-4 425 407 and US-A-4 476 178).

All these methods for producing a SiC layer on composite materials of the carbon-carbon type lead to a cracked layer, as a result of the difference of the thermal expansion coefficients between the carbon containing material and the silicon carbide. In order to obviate this disadvantage, a number of different filling materials have been envisaged (cf. FR-A-2 611 198 and FR-A-2 635 773).

Moreover, the methods involving the deposition of SiC by CPVD lead to an outer coating having a relatively mediocre adhesion, which can lead to the separation of this coating under normal conditions of use of parts protected by this coating, which is not the case with an outer coating obtained by siliciding. Moreover, during the production of this carbon-containing material, microcracks are created within the material.

The invention relates to a process for producing a carbon-containing composite material part, whose protection against oxidation is improved compared with that of the prior art. This part is able to withstand very high temperatures under reduced pressures.

In order to improve the oxidation resistance of the carbon-containing composite material parts, the Applicant has envisaged controlling the cracks of the outer coating by imposing preferred directions thereon with respect to the main directions of the underlying composite material.

As the problem of cracks in the SiC coating occurs for all ceramics having a higher thermal expansion coefficient than that of the carbon-containing material, the invention applies to all ceramics directly deposited on a carbon-containing material.

The present invention therefore relates to a process for the production of a carbon-containing composite material part, which is protected against oxidation, comprising:

(a) forming a fibrous preform of the part by superimposing layers of carbon-containing fibres, the fibres of each layer being parallel to one another and the N outermost layers of said superimposition, with N being an integral $\geq 2$, being arranged in such a way that their fibres are only oriented in accordance with a first or a second direction (x,y), the first and second directions being perpendicular to one another and contained in a same plane, (b) densifying the preform by a carbon-containing densification material, (c) forming an outer stable refractory carbonitride or carbide coating on the surface of the densified preform in order to give protection against oxidation of the material and the underlying carbon-containing fibres, said coating being formed by chemically reacting, at a temperature above ambient temperature, the N-1 outermost densified layers of the densified preform with at least one chemical compound constituting a precursor of said carbide or carbonitride, (d) allowing the assembly obtained in (c) to cool in order to form in the outer coating cracks in the thickness direction of said coating and issuing towards the outside of the part, these cracks being oriented in first and second directions and defining between them parallelepipedic blocks of said carbide or carbonitride and (e) filling the cracks.

The term carbon-containing fibres is understood to mean fibres of carbon or fibres of silicon carbide or silicon carbonitride (SiCN), or carbon fibres covered by a coating of silicon carbonitride or carbide. Preference is given to carbon fibres optionally covered by a coating of SiC.

The densification material forming the matrix of the part must be able to chemically react in order to form a carbide or carbonitride. In addition, as the carbon-containing matrix is used a matrix of pure carbon or a carbon matrix more particularly doped with an oxidation retardant, such as silicon carbide, boron, boron silicide or boron nitride. In the case of a doped matrix, the latter generally contains at the most 20% by weight of oxidation retardant and preferably 2 to 10% by weight thereof.

The number of fibre layers to be chemically transformed into refractory carbonitride or carbide is dependent on the envisaged application and the total thickness of the part. To ensure a good mechanical strength of the part, the thickness of the outer coating e must be less than the thickness of the carbon-containing part. In particular, e preferably satisfies the relation $e/E \leq 1/6$, in which E represents the total thickness of the part. With this condition respected, the number of transformed layers is generally 1, 2, 3 or 4. Thus, the carbon-containing portion of the part ensures the mechanical strength of the composite material, whilst the outer coating serves as the anti-oxidation protection.

The outer coating usable within the invention can be silicon carbide titanium, molybdenum, tantalum, niobium, tungsten, vanadium, aluminium or boron carbide or boron carbonitride, which is an approximately 30% atomic solid solution respectively of boron, carbon and nitrogen.

"Carbiding" or "carbonitriding" is in particular carried out by immersing the densified preform or blank in a mixture of powders which, by heating, gives off the vapours of the compound able to chemically react with the carbon.

For "carbiding", the vapours are generally those of the metal of the carbide and/or the oxide of this metal. For siliciding, the vapours of the siliciding species are silicon and/or silicon monoxide. In order to form tantalum carbide TaC, use is made of vapours of tantalum and/or $Ta_2O_5$, etc. For "carbonitriding" use is made of boron halide and ammonia vapours as the reagent.

The mixtures of powders usable for supplying the siliciding species are generally constituted by silicon carbide and at least one random oxide able to react with the silicon carbide to supply silicon monoxide. The oxide used is in particular silica or alumina.

With a mixture of $SiC+SiO_2$, at about 1650° C. mainly SiO is formed and at around 1800° C. a mixture of vapours of SiO and silicon. It is optionally possible to add to this mixture a silicon carbide excess in order to dilute the reactive elements and thus prevent, during the melting of the silica, that the latter agglomerates the mixture. The quantity of silica can be such that it is entirely consumed.

The $SiC+SiO_2$ mixture contains 50 to 75% by weight SiC and 50 to 25% by weight $SiO_2$.

With a mixture of $SiC+Si+Al_2O_3$, vapours of silicon and SiO are obtained with a clear preponderance of silicon vapours. This mixture generally contains 8 to 10% by weight alumina, 25 to 35% by weight silicon and 55 to 60% by weight silicon carbide.

The siliciding reactions with each of the siliciding vapours are as follows:

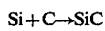

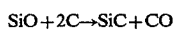

This siliciding is carried out in the presence of a neutral gas such as helium, argon or neon.

The above equations indicate that the volume variation is twice smaller with SiO than with silicon. In addition, the outer coating is less porous when use is made of a mixture of Si and SiO vapours as the reagent.

The immersion time of the densified material in the mixture of powders at the chosen temperature makes it possible to fix the number of transformed fibrous layers.

For example, the number of transformed fibrous layers is 2. In this case, preferably the first, second and third outermost layers are positioned in such a way that the fibres of the second layer are perpendicular to those of the first and third layers, the second layer being interposed between the first and third layers.

It is also possible to orient the fibres of the second and third layers parallel to one another, but perpendicular to the fibres of the first layer. These different arrangements make it possible to obtain blocks, whose surface is substantially square.

It is also possible to orient the fibres of the first and second layers parallel to one another and the fibres of the third layer perpendicular to those of the first and second layers, or orient the fibres of the first, second and third layers parallel to one another, the blocks obtained then being shaped like a rectangle on the surface.

The Inventors have found that in surprising manner the cracks formed in the outer carbide or carbonitride coating in directions orthogonal to those of the ex-fibres and "intersected" the latter. In particular, the hot transformation into carbide or carbonitride of several carbon fibre layers, stacked in such a way that the fibres were all parallel to one another and then densified by carbon necessarily led, during the cooling of the assembly, to cracks in the carbide or carbonitride oriented perpendicular to the direction of the ex-fibres. It is therefore the chemical transformation of the carbon into carbide or carbonitride, which imposes the shape and orientation of the blocks. This is due to the fact that the linear expansion coefficients of the carbides and carbonitrides exceed those of the underlying carbon-containing material.

Moreover, the layer of densified, carbon-containing fibres adjacent to the outer carbide or carbonitride coating prevents the separation of the latter by creating better interlaminar bonds between the underlying carbon-containing material and the carbide or carbonitride of the outer coating.

According to the invention, the layers of internal fibres of the composite material part, i.e. the layers underneath the N layers whose fibres are oriented in two perpendicular directions, can be arranged in accordance with known procedures. These layers can be arranged in such a way that the part has quasi-isotropic or specific mechanical properties in the same plane. In particular, these inner layers can be interlaced or not and arranged according to the 2.5D or 3D evo procedures respectively described in FR-A-2 610 951 and FR-A-2 612 950 filed by the Applicant.

The filling of the cracks firstly consists of a deposit of carbide by CPVD. This deposit significantly reduces the width of the crack. The carbide is advantageously the same as that of the outer coating.

In order to improve the healing of the cracks, it is then possible to deposit a layer of a refractory oxide. This refractory oxide can e.g. be constituted by silica and/or borosilicate glass ($SiO_2$—$B_2O_3$), as described in FR-A-2 611 198. The refractory oxide can also be $ThO_2$, $ZrO_2$, $HfO_2$, $La_2O_3$, $Y_2O_3$ and $Al_2O_3$.

In order to avoid a chemical reaction between the carbide of the outer coating and the oxide layer, it is possible to use an intermediate reaction barrier layer. This intermediate layer can be constituted by one of those described in FR-A-2 635 773.

The invention also relates to a carbon-containing composite material part protected against oxidation and obtained by the above process.

The invention is described in greater detail hereinafter relative to non-limitative embodiments and the attached drawings, wherein show:

FIG. 1 diagrammatically different stages of the production of a composite material part according to the invention.

Figure 2:
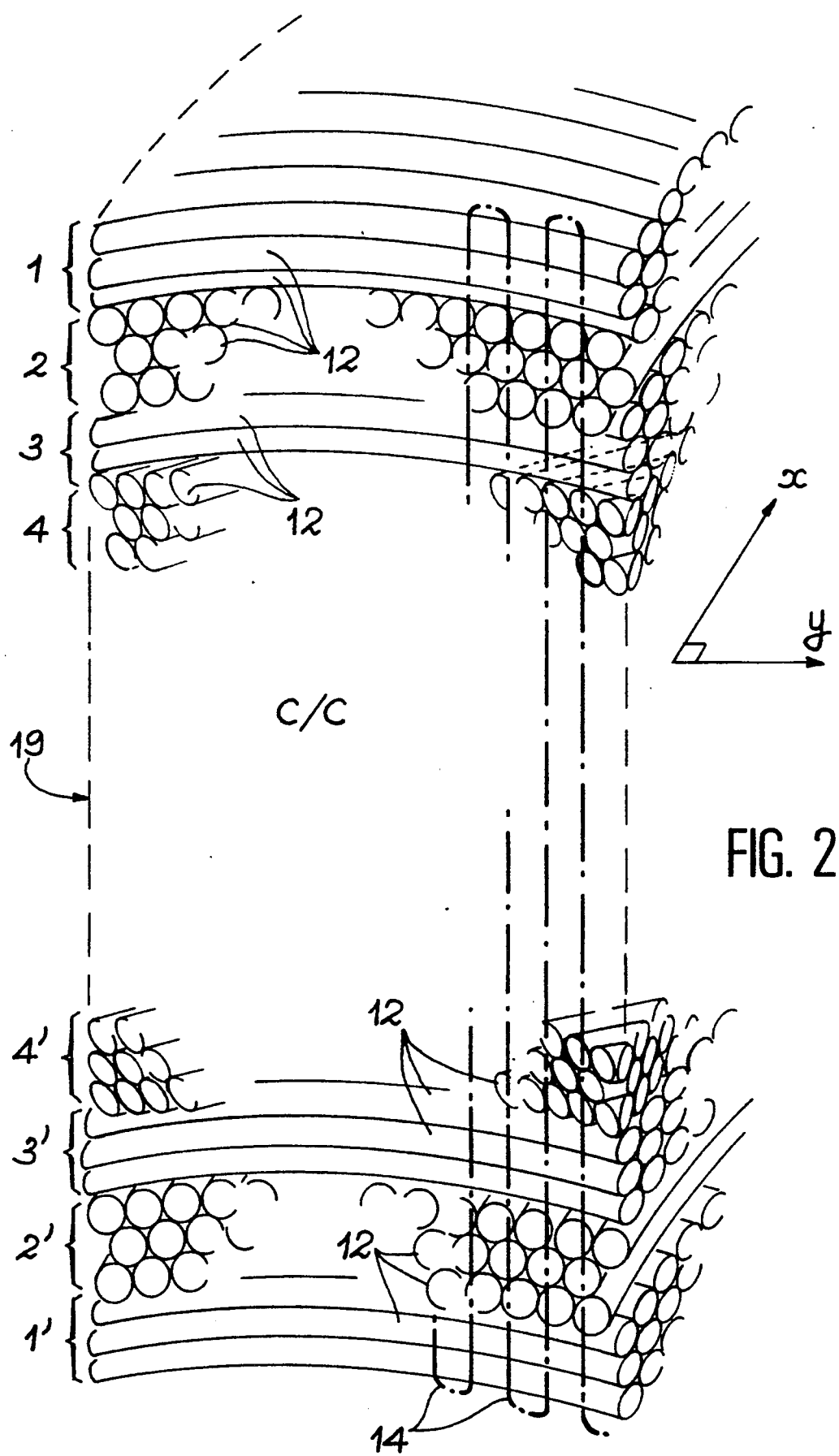

FIG. 2 the orientation of the layers of fibres of the preform according to the process of the invention.

Figure 3A:
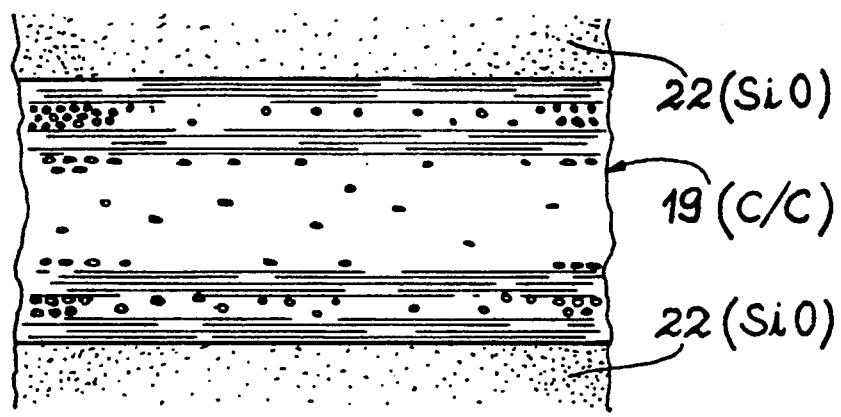
Figure 3B:
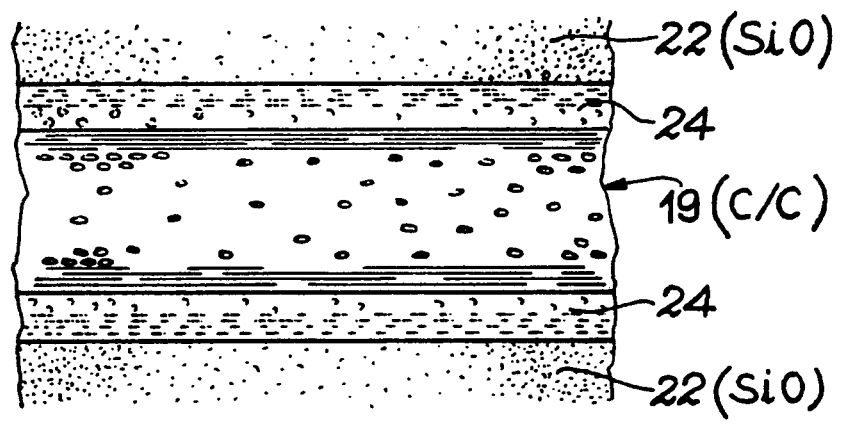
Figure 3C:
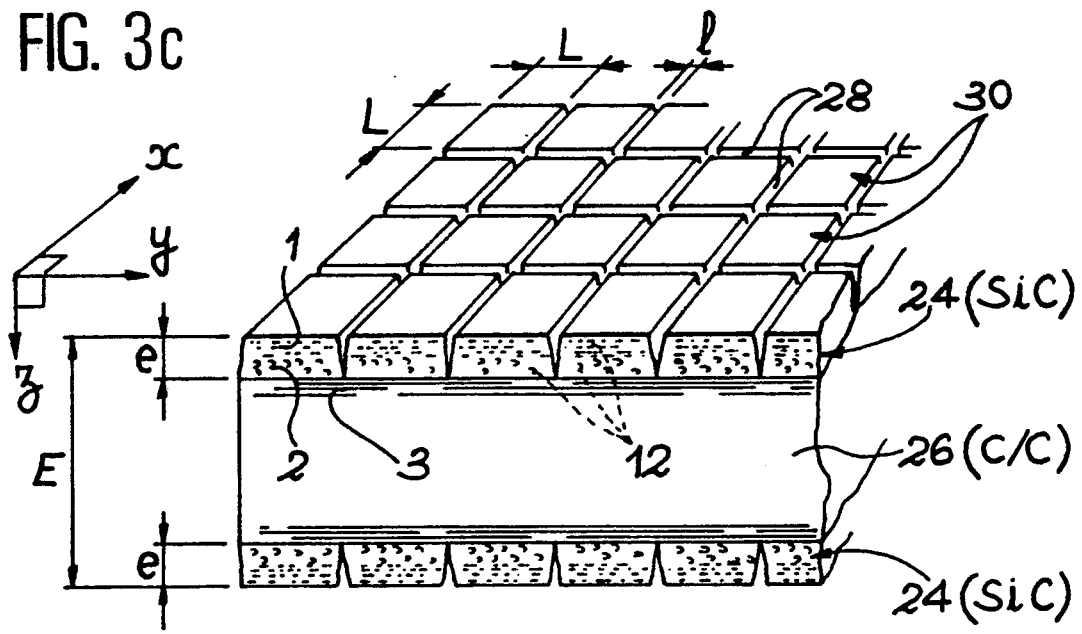

FIGS. 3a to 3c the siliciding stage of the process according to the invention.

Figure 4:
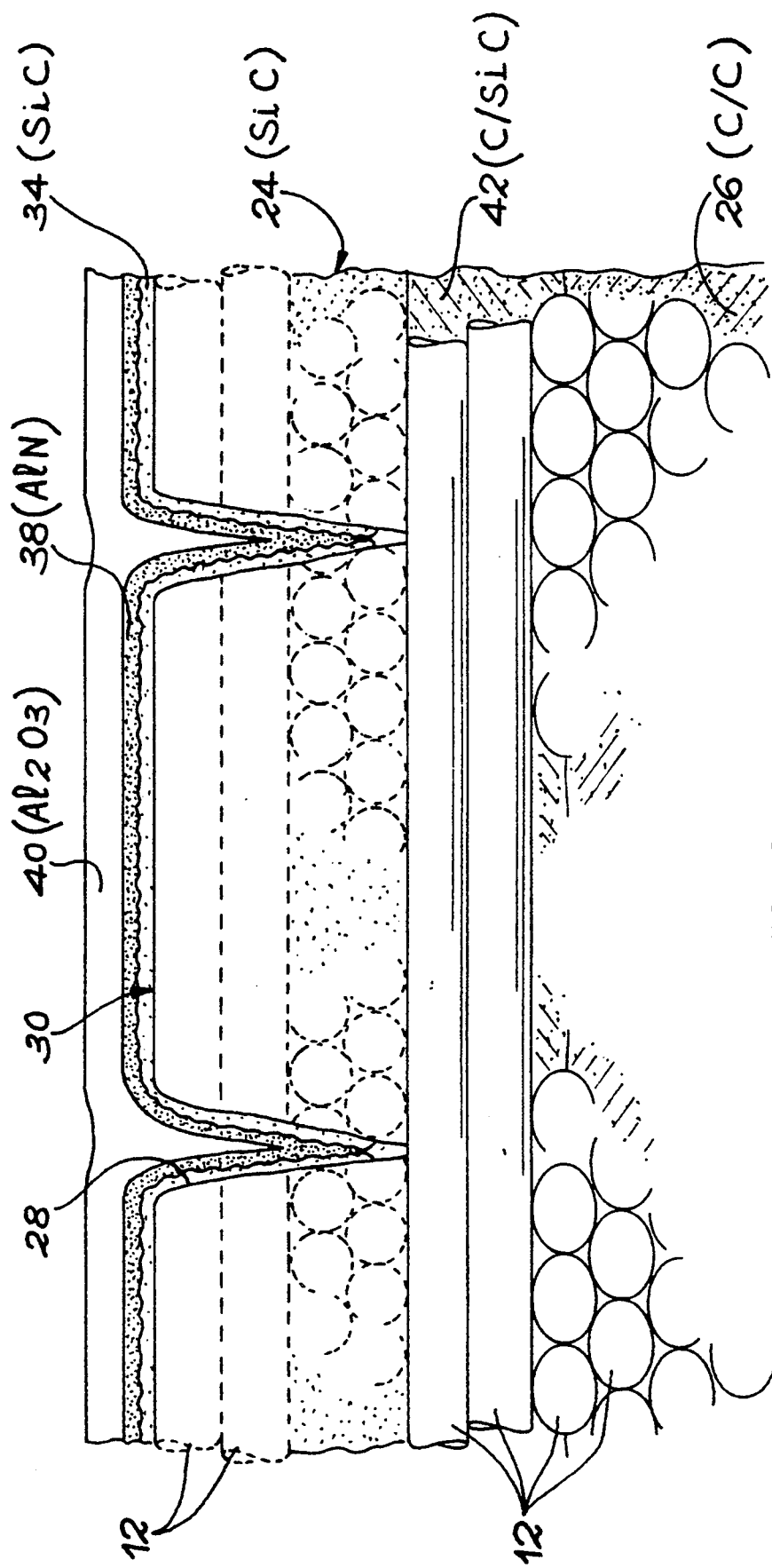

FIG. 4 a composite material part protected against oxidation according to the invention.

Figure 5:
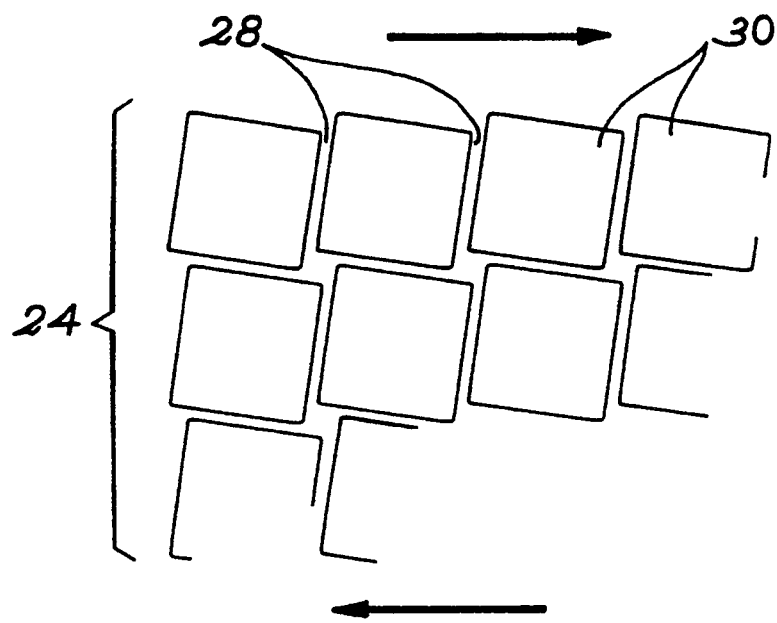

FIG. 5 the tectonic behaviour of the outer coating, when the part is exposed to shear forces.

Figure 6:
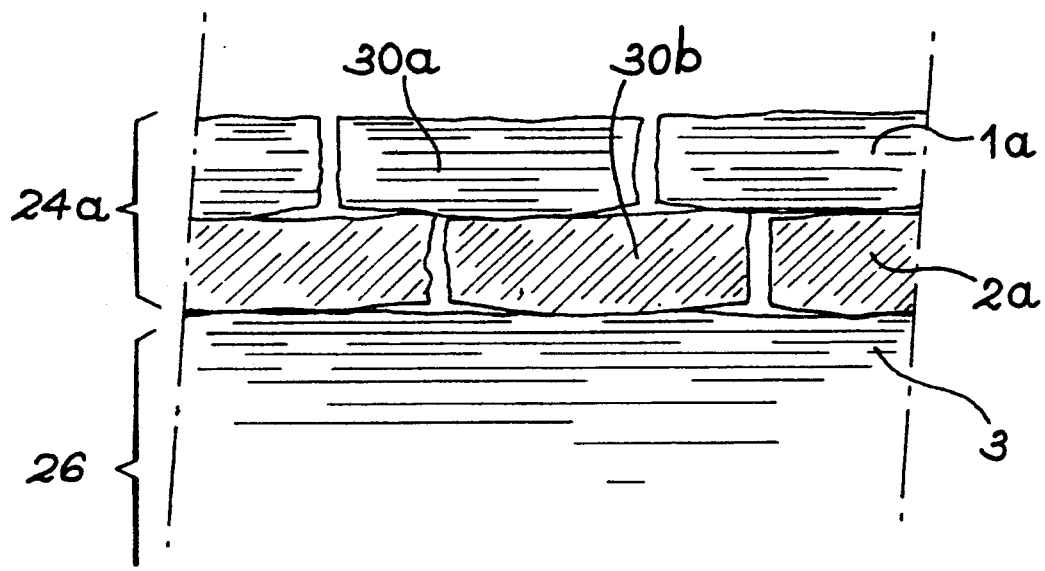

FIG. 6 the influence of an orientation of the fibres not in accordance with the invention on the orientation of the cracks and the disorganization of the blocks obtained.

For simplification purposes, the following description refers to the siliciding of two surface fibre layers. Moreover, this siliciding relates to the entire outer surface of the fibrous preform or blank and in particular the upper surface and lower surface of the preform.

On referring to FIGS. 1 and 2, the first stage of the process according to the invention consists of forming a fibrous preform 19 by superimposing layers 1 to 4 and 1' to 4' of carbon fibres 12. The preform 19 fixes the final shape of the composite material part and the number of superimposed layers is a function of its specific use. This stage is represented by frame 10 in FIG. 1.

The fibres 12 of each layer are oriented (FIG. 2) parallel to one another and are contiguous. They are generally in the form of bundles of 3000, 6000 or 1200 filaments, which are parallel to one another. In FIG. 2, the fibres 12 (or more precisely the fibre bundles) of the outer layer 1 of the upper surface of th preform 19 are oriented perpendicular to the fibres 12 of the underlying layer 2 and then parallel to the fibres 12 of the layer 3 underlying the layer 2. In the same way, the fibres 12 of the outer layer 1' of the lower surface of the preform are oriented perpendicular to those of the fibres of the underlying layer 2' and parallel to those of the fibres of the layer 3'.

This 90° intersecting orientation of the fibres of the outermost layers of the preform makes it possible to obtain an organized network of cracks in the outer coating, as will be shown hereinafter relative to FIGS. 3a to 3c.

It is possible to envisage arrangements other than that shown of the outer layers of the fibrous preform to be silicided. In particular, the following orientations can be used (0/90/0/ . . . ) or (90/0/0/ . . . ) or (0/0/90/ . . . ) or (0/0/0/ . . . ).

In FIG. 2, the superimposing of layers of fibres corresponds to a type 3D evo architecture, but obviously the invention has a much more general application, as has been shown hereinbefore.

In particular, the process according to the invention applies to the 2.5D architectures described in FR-A-2 610 951.

In FIG. 2, the fibres of layers 4 and 4' in contact with the layers respectively 3 and 3' are oriented at 45° relative to the fibres of the layers 3 and 3' respectively.

For example, a planar, quasi-isotropic 3D evo part according to the invention can have the following stack of layers:

(0/90/0/45/−45/90/0/45/45/90)sym.

In the above sym indicates that the stack is symmetrical relative to the centre of the part and the figures represent the orientation of the fibres relative to a reference direction. The FIGS. 0 and 90 respectively indicate a parallel orientation perpendicular to the reference direction and 45° and −45° respectively indicate an orientation at 45° and at −45° relative to said reference direction.

This stack leads to an isotropy of the mechanical properties in the plane, the layers of fibres working in accordance with four directions at 45° from one another. An architecture with four directions close to 45° from one another at any point in the structure e.g. makes it possible to form a component of a space shuttle nose.

Following the superimposing of the different layers of fibres according to the invention, a piercing 14 is carried out on the different layers to ensure their assembly. This piercing 14 is carried out with carbon fibres and constitutes the third orientation of the fibres in space. Further details of this procedure are given in FR-A-2 612 950.

The following stage of the process relates to the densification of the fibrous preform as indicated at 16 in FIG. 1. This densification consists of filling the spaces between the fibres 12 and thus form a carbon matrix optionally doped with 2 to 10% by weight SiC. It consists of several impregnation cycles of a carbon precursor and optionally SiC precursor, polymerization, pyrolysis and heat treatment. The precursor of the carbon can be a phenolic resin of the resol type or a furan resin. The doping by SiC can be carried out by grafting silicone functions on the phenolic resin.

Polymerization is carried out at atmospheric pressure up to 200° C. and is followed by crust removal in order to take off the excess resin. Pyrolysis is performed in a neutral medium at approximately 800° C. in order to transform the crosslinked polymer into hard coke. The heat treatment is performed at between 1200° and 1800° C.

The number of successive cycles of these operations is generally 5.

Following densification, a machining, designated 18 in FIG. 1 is carried out and this more particularly applies to the edges and holes used for the assembly of the finished mechanical part with other parts in order to produce the space craft.

The following stage of the process, designated 20 in FIG. 1, relates to the siliciding of the densified preform 19 with a view to forming the outer anti-oxidation protection coating. This stage is illustrated in greater detail in FIGS. 3a to 3c.

Siliciding consists of immersing (FIGS. 3a and 3b) the densified preform 19 in a mixture of powders 22 containing, by weight, 10% $Al_2O_3$, 30% Si and 60% SiC. These powders have a grain size between 30 and 60 μm and an apparent density after compression or tamping of 1000 Kg/m$^3$. Siliciding takes place in a graphite container. This loaded container then undergoes a heat treatment at 1700° C. in an argon atmosphere.

In this way the outer SiC coating 24 is formed over the entire outer surface of the densified preform 19. The siliciding time is a function of the sought thickness for the coating 24. After removing the siliciding powder the part is cleaned and the structure obtained is that shown in FIG. 3c.

If e represents the thickness of the coating 24 and E the total thickness of the silicided part, $2e/E \leq \frac{1}{3}$ must be obtained to ensure that the final part has a good mechanical behaviour, which is due to the fibres 12 and to the carbon-containing matrix 26.

For example, it is possible to silicide a densified fibrous preform of the carbon-carbon type with a total thickness of 4 mm, with a thickness of 0.4 mm on each side, each layer of fibres having a thickness of 0.2 mm.

Siliciding is a thermochemical reaction locally transforming the carbon of the fibres and that of the matrix into silicon carbide as from the outer surfaces of the part and namely up to an optimized thickness with respect to the diffusion of oxidizing gases. The chemical reactions involved were indicated hereinbefore.

On cooling, the expansion incompatibility between the carbon of the fibres and the matrix and the silicon carbide of the outer coating 24 creates cracks 28 traversing the silicided layer 24 (FIG. 4) parallel to its thickness (axis z) and slightly penetrating the carbon-containing matrix 26. These cracks issue to the outside. The cracking of the outer coating, shown in FIGS. 3c, 4 to 6 is that which is obtained at ambient temperature (20° to 25° C.).

As a result of the orientation of the fibres of the outer layers 1 and 2 of the preform in two perpendicular directions x and y, the cracks 28 are oriented in accordance with these two directions. Thus, parallelepipedic SiC blocks 30 are obtained and in this particular case are shaped like a square in the plane xy and of side L. These blocks are independent of one another and adhere perfectly to the carbon-containing matrix 26.

According to the invention, the cracks 28 of the silicided layer 24 retain the memory of the orientation of the ex-fibres 12 of carbon transformed into SiC. Thus, the SiC layer is regularly broken up in the direction of the carbon ex-fibres during the cooling of the siliciding treatment with a millimetric spacing 1.

With the aid of an optical microscope, it is possible to see the orientation of the fibres at the origin of the network of cracks.

The greater the depth siliciding, the more open the cracks 28 and the larger the upper surface of the blocks. The surface L$^2$ of the blocks is dependent on the relative thicknesses of the carbon portion 26 and the thickness e of the silicided layers, as well as the intrinsic properties of the material, such as the expansion coefficients, its modulus and thermochemical contributions.

In summarizing, the width 1 of the cracks and the width L of the blocks increase in accordance with a monotonic function with the siliciding thickness e, everything else being equal.

Moreover, at ambient temperature 1 is dependent on the production temperature of the silicide layer 24 and in particular on the temperature difference between the maximum production temperature and ambient temperature.

The cracks of the SiC layer close again when the temperature rises and the blocks become contiguous for a temperature equal to that of carbide production.

In particular, these cracks tend to reclose during the use of the parts at high temperature. For a production at 1700° C. of the silicided coating, a use of the mechanical part at 1700° C. leads to a complete closure of the cracks. For example, for a production at 1700° C. $1=0$ $\mu$m at 1700° C., $1=4$ $\mu$m at 1000° C. and 1–10 $\mu$m at 20° C.

Moreover, the expansion behaviour of the carbon fibres 12, which is of an anisotropic nature, leads to a microcracking of the matrix 26. Thus, the expansion coefficient of a fibre in its length direction is low or even negative, whilst radially it is relatively high. In addition, the precursor of the fragile carbon-containing matrix cannot always adapt with respect to said anisotropy and become associated with the volume change resulting from the heat treatments of the densification.

The microcracks of the matrix differ as a function of the position of the matrix in the composite material part and the reciprocal orientations of the fibres. Moreover, the heat treatments for producing the matrix and the possible coating of the carbon fibres by an appropriate material, referred to as sizing, makes it possible to obtain a very strong carbon-carbon composite material. This results from the fibre/matrix bonds which, for high stresses, will permit rectilinear or angular microdisplacements and gradually the transfer of charges to adjacent fibres by successive breaking operations of said bonds.

The coating of the fibres by the sizing product is carried out during the production of the layers of fibres or on the actual fibres prior to weaving.

The sizing products and the coating methods usable in the invention are those of the prior art.

During the use of the mechanical part, the cracks of the outer coating lead to a preferred penetration of the oxygen into the carbon-containing matrix 26 and it is also necessary to fill them.

The first stage of the healing of the cracks indicated at 32 in FIG. 1 consists of depositing a SiC layer 34 (FIG. 4) by CPVD. To this end, the part is placed in an isothermal furnace or oven kept at approximately 1000° C. and in which circulates a mixture of chlorosilane $(CH_3)_n SiCl_{(4-n)}$ with $0 \leq n \leq 4$, associated with a hydrocarbon and in particular an alkane (methane, ethane, propane) and/or hydrogen. For example, use is made of a mixture of trichloromethyl silane and hydrogen in a $(H_2)/(CH_3SiCl_3)$ ratio of 4 to 12.

This stage lasts approximately twice two hours, namely two hours for the upper face of the part and two further hours for the lower face.

This SiC deposit 34 shown in FIG. 4 makes it possible to reduce the width 1 of the cracks 28, but without closing them. Thus, as the SiC deposit 34 takes place at high temperature, their spacing is already reduced compared with that at ambient temperature, which does not permit a penetration of the SiC to the bottom of the cracks. This reduction of the opening of the cracks largely limits the oxygen penetration into the carbon-containing matrix during the use of the part.

This is followed by a second crack filling stage 36. As shown in FIG. 4, this healing process can consist of a deposit of an aluminium nitride coating 38 over the entire outer (lower or upper) surface of the part, followed by a deposition of an alumina coating 40.

The aluminium nitride coating serves as a reaction barrier between the SiC 34 and the alumina 40. The AlN coating can be produced with a mixture of aluminium chloride, hydrogen and ammonia, accompanied by neutral gas (in particular argon) scavenging. This AlN coating is deposited by CPVD at approximately 950° C. The average thickness of the coating is approximately 1.5 μm.

The alumina coating 40 is deposited by CPVD at approximately 950° C. with a mixture of $AlCl_3$, $H_2O$ and $CO_2$. The coating 40 has a thickness of approximately 5 μm.

It is possible to replace the aluminium nitride coating by a hafnium nitride coating.

The part obtained in this way can be used under particularly severe ambient conditions and in particular for forming the nose of space-craft exposed to temperatures of approximately 1800° C. on reentering the atmosphere. For other uses, it is possible to replace the AlN and alumina coatings respectively by a silica coating and a borosilicate glass coating, as described in FR-A-2 611 198.

With this type of protection, the part obtained can be used for forming the leading edges of a space shuttle.

As shown in FIG. 4, the siliciding of the carbon-carbon material not only leads to the formation of SiC blocks 24, but also to the formation of an underlayer 42 of carbon and SiC ensuring a good adhesion of the coating 24 to the carbon-carbon material.

A study of the mechanical behaviour of the anti-oxidation protection (AOP) obtained in this way (SiC layer, plus healing of the cracks) reveals a tectonic mechanical behaviour.

From the mechanical standpoint, the relatively thick siliciding SiC layer (a few tenths of a millimeter) compared with the healing thickness imposes itself, whilst all the different healing deposits occurs on a moving bed of blocks. The mechanical participation of this healing is of a secondary nature in view of its limited thickness (<10 μm).

As the main directions of the network of cracks are orthogonal, the equivalent material of the anti-oxidation protection is naturally considered to be orthotropic. The orthotropic axes of the AOP coincide with those of the underlying carbon-carbon material.

The tectonic description of the AOP in accordance with its orthotropic axes will now be given.

COMPRESSION

The mechanical compression forces transmitted to the AOP tend to reclose the cracks and the blocks progressively move against one another. This progressive stack resembles a spring located between two blocks. The equivalent compression modulus of the AOP is average, because it is dependent on the high modulus of the SiC block and the limited stiffness of the inter-block "spring".

When the forces increase, the cohesion of the blocks, close to the two silicided surfaces, improves the stability of the SiC/C—C/SiC sandwich. The equivalent compression breaking stress of the AOP is high.

For limited thickness unoxidizable carbon-carbon materials, the AOP increases considerably the compression characteristics of the sandwich.

TENSION

The blocks tend to open and it is no longer possible to count on the modulus of the SiC block. A tension in a main direction is combined with a transverse compression by the Poisson effect and a limited participation of the spring can be envisaged. By an interlaminar shear entrainment flux of the AOP towards the carbon-carbon, it is possible for the local rigidity of the latter beneath a block to be increased, thus slightly increasing the overall rigidity. In practice, the mechanical participation of the AOP is negligible in tension.

PLANAR SHEAR

The participation of the AOP is intermediate between the two extremes constituted by tension and compression. FIG. 5 shows the blocks, which are auto-blocking by rotation and are supported against one another.

Therefore the shear stress and modulus of the AOP must be taken into account, because they improve the characteristics of the limited thickness, unoxidizable carbon-carbon sandwich.

If instead of orienting the fibres of the outermost layers in accordance with two perpendicular directions (FIG. 2), as shown in FIG. 6, the fibres 12 of the upper layer 1a and those of the underlying layer 2a had been oriented in two directions forming an angle of 45°, there would have been a corresponding damage to the outer coating 24a during a random mechanical stressing of the protected part.

Thus, this 45° surface orientation of the fibres leads to the formation of two types of blocks 30a and 30b, one type per layer of fibres, and to cracks between the blocks which are totally displaced between the individual layers. The mechanical stressing then causes a delamination of the upper layer 1a of silicided fibres entraining with it the healing layers of the cracks.

The loss of most of the AOP leads to a significant oxidation of the carbon-containing part during its use at high temperature.

The microcracks of the carbon matrix and the organized cracks of the SiC layer of the AOP are fundamental elements for a very good mechanical behaviour in the presence of heat of the composite material parts. With respect to carbon-containing composite materials, these microcracks and cracks in well controlled form indicate their non-fragile behaviour. The understanding of the mechanical behaviour of the carbon-carbon part and the tectonics of its AOP have made it possible, according to the invention, to contribute to the improvement of composite material parts and in particular their resistance to oxidation.

I claim:

1. In a process for the production of a carbon-containing composite material part, which is protected against oxidation, in which a carbon-fibre containing fibrous preform is densified with the carbon-containing densification material, a refractory material is formed in the outer surface of the densified preform, and cracks in the outer coating filled, the improvement wherein:

(a) the fibrous preform is formed by superimposing layers of carbon-containing fibres, the fibres of each layer being parallel to one another and the N outermost layers of said superimposition, with N being an integral ≧2, being arranged in such a way that their fibres are only oriented in accordance with a first or a second direction (x,y), while the internal layers of said superimposition being arranged in such a way that their fibres are oriented with a third direction, the first and second direction being perpendicular to one another and contained in a same plane, the third direction being also contained in said plane;

(b) the fibrous preform is densified by a carbon-containing material;

(c) an outer stable refractory carbonitride or carbide coating is formed on the surface of the densified preform by chemically reacting, at a temperature above ambient temperature, the N−1 outermost densified layers of the densified preform with at least one chemical compound precursor of said carbide or carbonitride;

(d) the assembly obtained in (c) is allowed to cool in order to form in the outer coating cracks in the thickness direction of said coating and issuing towards to the outside of the part, said cracks being oriented in first and second directions and defining between them parallelepipedic blocks (30) of said carbide or carbonitride; and (e) filling the cracks with a refractory carbide or carbonitride.

2. In a process for the production of a carbon-containing composite material part, which is protected against oxidation, in which a carbon-fibre containing fibrous preform is densified with a carbon-containing densification material, a refractory material is formed in the outer surface of the densified preform, and cracks in the outer coating filled, the improvement wherein:

(a) the fibrous preform is formed by superimposing layers of carbon-containing fibres, the fibres of each layer being parallel to one another and the N outermost layers of said superimposition, with N being an integral $\geq 2$, being arranged in such a way that their fibres are only oriented in accordance with a first or a second direction (x,y), while the internal layers of said superimposition being arranged in such a way that their fibres are oriented with a third direction, the first and second directions being perpendicular to one another and contained in a same plane, the third direction being also contained in said plane;

(b) the fibrous preform is densified by a carbon-containing material;

(c) an outer stable refractory carbonitride or carbide coating is formed on the surface of the densified preform by chemically reacting, at a temperature above ambient temperature, the N−1 outermost densified layers of the densified preform with at least one chemical compound precursor of said carbide or carbonitride;

(d) the assembly obtained in (c) is allowed to cool in order to form in the outer coating cracks in the thickness direction of said coating and issuing towards the outside of the part, these cracks being oriented in first and second directions and defining between them parallelepipedic blocks (30) of said carbide or carbonitride;

(e) the assembly obtained in (c) in allowed to cool in order to form in the outer coating cracks in the thickness direction of said coating and issuing towards the outside of the part, these cracks being oriented in first and second directions and defining between them parallelepipedic blocks (30) of said carbide or carbonitride, the cracks are filled by a refractory carbide or carbonitride; and (f) depositing a layer of refractory oxide on the outer coating and filled cracks.

3. In a process for the production of carbon-containing composite material part, which is protected against oxidation, in which a carbon-fibre containing fibrous preform is densified with a carbon-containing densification material, a refractory material is formed in the outer surface of the densified preform, and cracks in the outer coating filled, the improvement wherein:

(a) the fibrous preforms is formed by superimposing layers of carbon-containing fibres, the fibres of each layer being parallel to one another and the N outermost layer of said superimposition, with N being an integral $\geq 2$, being arranged in such a way that their fibres are only oriented in accordance with a first and second direction (x,y), while the internal layers of said superimposition being arranged in such a way that their fibres are oriented with a third direction, the first and second directions being perpendicular to one another and contained in a same plane, the third direction being also contained in said plane;

(b) the fibrous preform is densified by a carbon-containing material;

(c) an outer stable refractory carbonitride or carbide coating is formed on the surface of the densified preform by chemically reacting, at a temperature above ambient temperature, the N−1 outermost densified layers of the densified preform with at least one chemical compound constituting precursor of said carbide or carbonitride;

(d) the assembly obtained in (c) is allowed to cool in order to form in the outer coating cracks in the thickness direction of said coating and issuing towards the outside of the part, these cracks being oriented in first and second directions and defining between them parallelepipedic blocks (30) of said carbide or carbonitride;

(e) filling the cracks with a refractory carbide or carbonitride; and (f) depositing a layer of refractory oxide on the outer coating and filling cracks.

4. In a process according to claim 1, the improvement wherein the thickness of the carbide or carbonitride layer is less than the thickness of material and underlying carbon-containing fibres not transformed into carbide or carbonitride.

5. In a process according to claim 1, the improvement wherein the layers of fibres located below the outermost N layers are arranged in such a way that the part has quasi-isotropic or specific mechanical properties in accordance with the said plane.

6. In a process according to claim 1, the improvement wherein the chemical compound is silicon or a compound of silicon, and the outer coating is silicon carbide.

7. In a process according to claim 1, the improvement wherein the fibres are carbon fibres.

8. In a process according to claim 1, the improvement wherein the densification material is essentially carbon.

9. In a process according to claim 1, the improvement wherein the desification material is carbon doped by an oxidation retardant.

10. In a process according to claim 1, the improvement wherein N=3.

11. In a process according to claim 10, the improvement wherein the outermost first, second and third layers are positioned in such a way that the fibres of the second layer are perpendicular to those of the first and third layers, and the second layer is interposed between the first and third layers.

12. In a process according to claim 1, the improvement wherein the cracks are filled by chemical vapour phase deposition of a refractory carbide or carbonitride in the cracks.

13. In a process according to claim 1, the improvement wherein the cracks are initially filled, in part, by first depositing a layer of a refractory oxide.

14. In a process according to claim 1, the improvement wherein the fibres of each layer are coated with silicon carbonitride or carbide prior to the superimposing of the layers.

15. In a process according to claim 2, the improvement wherein the thickness of the carbide or carbonitride layer is less than the thickness of the carbide or carbonitride layer is less than the thickness of material and underlying carbon-containing fibres not transformed into carbide or carbonitride.

16. In a process according to claim 2, the improvement wherein the layers of fibres located below the outermost N layers are arranged in such a way that the part has quasi-isotropic or specific mechanical properties in accordance with the said plane.

17. In a process according to claim 2, the improvement wherein the chemical compound is silicon or a compound of silicon, and the outer coating is silicon carbide.

18. In a process according to claim 2, the improvement wherein the fibres are carbon fibres.

19. In a process according to claim 2, the improvement wherein the densification material is essentially carbon.

20. In a process according to claim 2, the improvement wherein the densification material is carbon doped by an oxidation retardant.

21. In a process according to claim 2, the improvement wherein $N=3$.

22. In a process according to claim 21, the first, second and third layers are positioned in such a way that the fibres of the second layer are perpendicular to those of the first and third layers, and the second layer is interposed between the first and third layers.

23. In a process according to claim 2, the improvement wherein the cracks are filled by chemical vapour phase deposition of a refractory carbide or carbonitride in the cracks.

24. In a process according to claim 2, the improvement wherein the cracks are initially filled, in part, by first depositing a layer of a refractory oxide.

25. In a process according to claim 2, the improvement wherein the fibres of each layer are coated with silicon carbonitride or carbide prior to the superimposing of the layers.

26. In a process according to claim 3, the improvement wherein the thickness of the carbide or carbonitride layer is less than the thickness of material and underlying carbon-containing fibres not transformed into carbide or carbonitride.

27. In a process according to claim 3, the improvement wherein the layers of fibres located below the outermost N layers are arranged in such a way that the part has quasi-isotropic or specific mechanical properties in accordance with the said plane.

28. In a process according to claim 3, the improvement wherein the chemical compound is silicon or a compound of silicon, and the outer coating is silicon carbide.

29. In a process according to claim 3, the improvement wherein the fibres are carbon fibres.

30. In a process according to claim 3, the improvement wherein the densification material is essentially carbon.

31. In a process according to claim 3, the improvement wherein the densification material is carbon doped by an oxidation retardant.

32. In a process according to claim 3, the improvement wherein $N=3$.

33. In a process according to claim 32, the improvement wherein the outermost first, second and third layers are positioned in such a way that the fibres of the second layer are perpendicular to those of the first and third layers, and the second layer is interposed between the first and third layers.

34. In a process according to claim 3, the improvement wherein the cracks are filled by chemical vapour phase deposition of a refractory carbide or carbonitride in the cracks.

35. In a process according to claim 3, the improvement wherein the cracks are initially filled, in part, by first depositing a layer of a refractory oxide.

36. In a process according to claim 3, the improvement wherein the fibres of each layer are coated with silicon carbonitride or carbide prior to the superimposing of the layers.

* * * * *

UNITED STATES PATENT AND TRADEMARK OFFICE
CERTIFICATE OF CORRECTION

PATENT NO. : 5,360,638
DATED : November 1, 1994
INVENTOR(S) : Jean-Michel Lequertier It is certified that error appears in the above-indentified patent and that said Letters Patent is hereby corrected as shown below:

Claim 2, Col. 11, line 57, "in" (second occurrence) should be ---is---.

Claim 9, Col. 12, line 57, "desification" should be --densification--.

Claim 15, Col. 13, line 12, after "of" delete "the carbide or".

Claim 15, Col. 13, line 13, before "material" delete "carbonitride layer is less than the thickness of".

Signed and Sealed this

Ninth Day of May, 1995

Attest:

BRUCE LEHMAN

Attesting Officer        Commissioner of Patents and Trademarks